United States Patent
Lee et al.

(10) Patent No.: US 9,128,312 B2
(45) Date of Patent: Sep. 8, 2015

(54) FLAT DISPLAY DEVICE

(75) Inventors: Jong-Nam Lee, Yongin (KR); Kyu-Seok Kim, Yongin (KR); Do-Hyun Kim, Yongin (KR); Jeong-Min Park, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 363 days.

(21) Appl. No.: 13/330,798

(22) Filed: Dec. 20, 2011

(65) Prior Publication Data

US 2012/0212928 A1    Aug. 23, 2012

(30) Foreign Application Priority Data

Feb. 22, 2011    (KR) .................... 10-2011-0015569

(51) Int. Cl.
   *G02F 1/1333*    (2006.01)
(52) U.S. Cl.
   CPC ........ *G02F 1/1333* (2013.01); *G02F 1/133305* (2013.01); *G02F 1/133308* (2013.01); *G02F 2001/133311* (2013.01); *G02F 2001/133317* (2013.01); *G02F 2201/50* (2013.01); *G02F 2202/28* (2013.01)
(58) Field of Classification Search
   CPC ............. G02F 2001/133311; G02F 1/133512; G02F 2203/02; G02B 1/04
   USPC ................. 362/19, 97.1–97.4, 632–634, 609; 349/58, 61–65, 70–7
   See application file for complete search history.

(56) References Cited

U.S. PATENT DOCUMENTS

| | | | |
|---|---|---|---|
| 6,854,856 B2 * | 2/2005 | Shin et al. ..................... 362/613 |
| 7,283,185 B2 * | 10/2007 | Hirakata et al. ................ 349/58 |
| 7,339,635 B2 * | 3/2008 | Freking et al. .................. 349/58 |
| 8,259,266 B2 * | 9/2012 | Huang et al. .................. 349/122 |
| 2002/0126470 A1 * | 9/2002 | Saito et al. ...................... 362/31 |
| 2004/0062029 A1 * | 4/2004 | Ato ................................. 362/31 |
| 2005/0099790 A1 * | 5/2005 | Kang et al. ....................... 362/31 |
| 2006/0285362 A1 * | 12/2006 | Cho et al. ....................... 362/633 |
| 2007/0177248 A1 * | 8/2007 | Kanbayashi .................. 359/296 |
| 2009/0141209 A1 * | 6/2009 | Chen et al. ....................... 349/58 |
| 2009/0153774 A1 * | 6/2009 | Wu et al. ......................... 349/62 |
| 2009/0201438 A1 * | 8/2009 | Kim et al. ........................ 349/58 |
| 2009/0310057 A1 * | 12/2009 | Kang et al. ....................... 349/58 |
| 2010/0039584 A1 * | 2/2010 | Sasaki et al. ..................... 349/62 |
| 2010/0171900 A1 * | 7/2010 | Lee ................................. 349/58 |
| 2010/0171915 A1 * | 7/2010 | Huang et al. .................. 349/122 |
| 2010/0315575 A1 * | 12/2010 | Chang et al. ..................... 349/62 |
| 2011/0026240 A1 * | 2/2011 | Hayashi et al. ............... 362/97.1 |

(Continued)

FOREIGN PATENT DOCUMENTS

| KR | 10-2008-0035784 A | 4/2008 |
|---|---|---|
| KR | 10-2008-0099050 A | 11/2008 |

(Continued)

*Primary Examiner* — Peggy Neils
*Assistant Examiner* — Zheng Song
(74) *Attorney, Agent, or Firm* — Lee & Morse, P.C.

(57) ABSTRACT

A flat display device includes a flat display module that produces an image. The device also includes a reflective sheet at a rear side of the flat display module, a support member on the reflective sheet, and an optical adhesive film adhered to the front surface of the flat display module, to sides of the flat display module, and to a portion of a back of the support member that is opposite the reflective sheet. The image is produced on the front surface of the flat display module and is emitted through the optical adhesive film.

29 Claims, 8 Drawing Sheets

(56) References Cited

U.S. PATENT DOCUMENTS

2011/0103041 A1* 5/2011 Mathew et al. ............. 362/97.3
2012/0113369 A1* 5/2012 Kim et al. .................... 349/122
2012/0169963 A1* 7/2012 Park .............................. 349/62

FOREIGN PATENT DOCUMENTS

| KR | 10-2009-0056210 A | 6/2009 |
| KR | 10-2009-0073449 A | 7/2009 |
| KR | 10-2009-0129559 | 12/2009 |

\* cited by examiner

FLAT DISPLAY DEVICE

CROSS-REFERENCE TO RELATED PATENT APPLICATION

This application claims the benefit of Korean Patent Application No. 10-2011-0015569, filed on Feb. 22, 2011, in the Korean Intellectual Property Office, the disclosure of which is incorporated herein in its entirety by reference.

BACKGROUND

Embodiments relate to a flat display device. Recently, flat display devices, which may replace cathode ray tubes, have been developed. These flat display devices may include liquid crystal displays (LCDs), field emission displays (FEDs), plasma display panels (PDPs), electro-luminescence (EL) displays, and the like.

SUMMARY

Embodiments may be realized by providing a flat display device including a flat display module for producing an image, a reflective sheet disposed at a back of the flat display module, a support member disposed at a back of the reflective sheet; and an optical adhesive film adhered to a front surface and sides of the flat display module and to a portion of a back of the support member. The image produced on the front surface of the flat display module is emitted through the optical adhesive film.

The reflective sheet may reflect light generated from the flat display module and transmit the light facing the optical adhesive film.

The support member may include plastic.

The support member may prevent the optical adhesive film from directly contacting the reflective sheet and prevent removal of the reflective sheet, which may be generated when the optical adhesive film is directly adhered to the reflective sheet.

The optical adhesive film may include a transmission unit disposed on the front surface of the flat display module for transmitting the image, a wing unit extended from one end of the transmission unit to cover the sides and the portion of the back of the flat display module, and an adhesive member disposed throughout the transmission unit and the front surface of the wing unit. The adhesive member may adhere the flat display module, the transmission unit, and the wing unit.

The transmission unit may transmit light emitted from the flat display module.

The transmission unit may include Polyethylene terephthalate (PET), a triacetyl cellulose (TAC) film, polyethylene (PE), acryl, or polyolefin.

The transmission unit may be formed to be the same size as or greater than a display area for displaying the image on the flat display module.

The wing unit may have a thickness greater than the flat display module.

The wing unit may cover one side of the flat display module and the portion of the back of the support member.

The wing unit may include: a base unit formed by extending from one side of the transmission unit; a light-blocking member disposed on the base unit; and a reflective member disposed on the light-blocking member.

The base unit may be integrally formed with the transmission unit as a single body.

The base unit may include polyethylene terephthalate (PET), a triacetyl cellulose (TAC) film, polyethylene (PE), acryl, or polyolefin.

The light-blocking member may absorb external light incident through the base unit.

The light-blocking member may include paint or a pigment that may absorb visible light.

The light-blocking member may be larger than or the same size as the reflective member.

The light-blocking member may be disposed on the entire wing unit and the portion of the transmission unit.

The reflective member may reflect light emitted from the flat display device and prevent the light from lea.

The reflective member may include paint or a pigment that may reflect the light.

The flat display module may include a backlight unit, a polarizer, and a liquid crystal panel that are sequentially stacked.

The reflective sheet and the support member may be separately formed and are laminated.

The support member may have a thickness greater than that of the reflective sheet.

The reflective sheet may be formed by coating a reflective material on the support member.

The reflective sheet may be formed by adhering a reflective film on the support member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
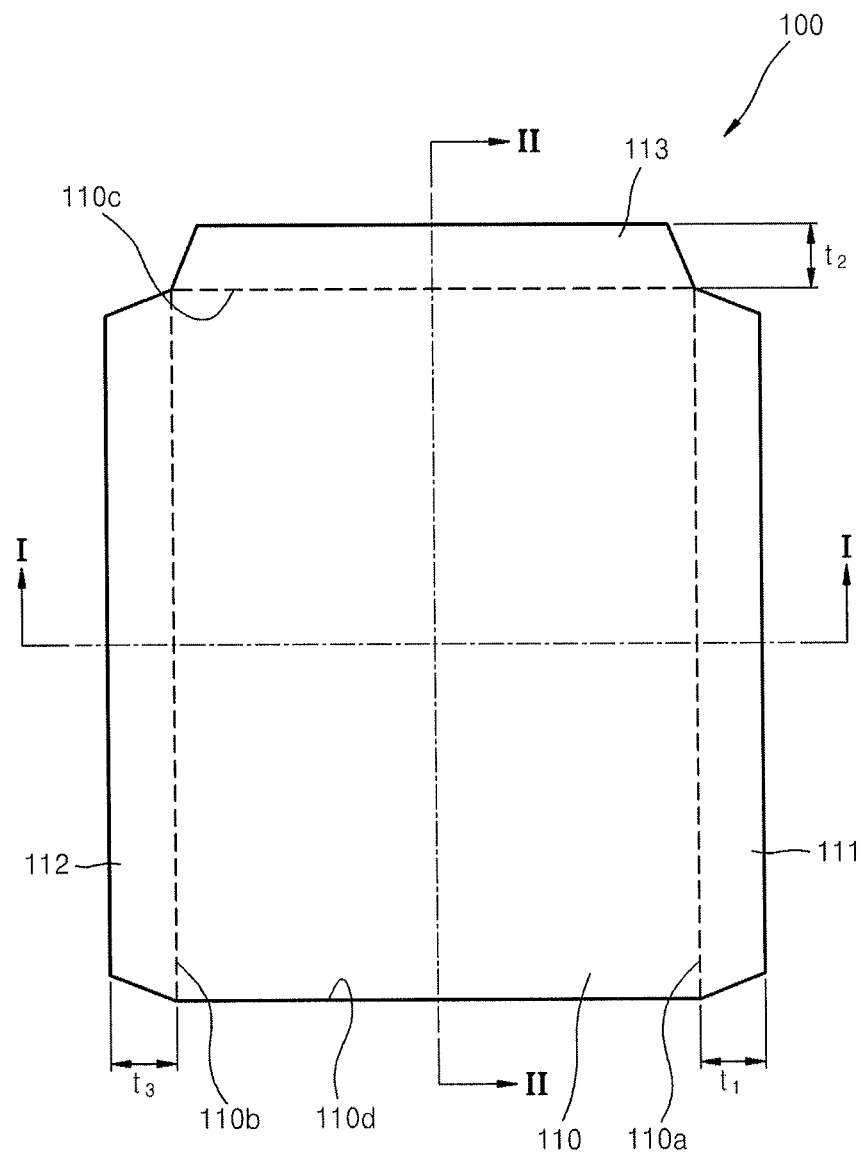
FIG. 1 illustrates a plan view schematically showing an optical adhesive film.

Korean Patent Application No. 10-2011-0015569, filed on Feb. 22, 2011, in the Korean Intellectual Property Office, and entitled: "Flat Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Like reference numerals refer to like elements throughout.

Active matrix liquid crystal display devices, to which a thin-film transistor (TFT) may be applied as a switching device, may use a semiconductor process and thus it is hard for them to have large area displays. However, the active matrix liquid crystal display devices are mainly used as display devices in laptop computers and thus demand therefor has increased.

Liquid crystal display devices are non-self light emitting devices and may include a liquid crystal display panel and a backlight unit. The backlight unit is disposed below the liquid crystal display panel, and both the backlight unit and liquid crystal display panel may be adhered to each other by a double-sided tape.

Figure 2:
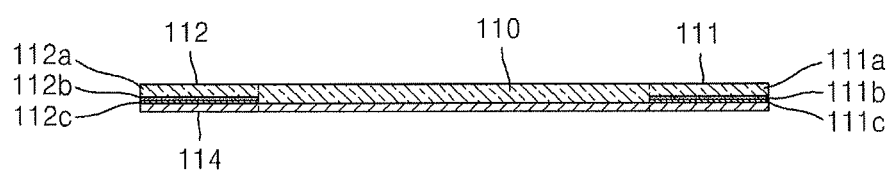
FIG. 2 illustrates a cross-sectional view of the optical adhesive film of FIG. 1, along a line I-I of FIG. 1.
Figure 3:
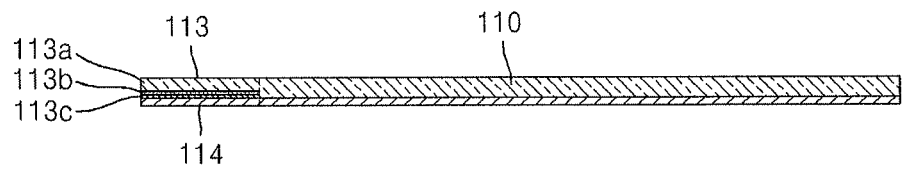
FIG. 3 illustrates a cross-sectional view of the optical adhesive film of FIG. 1, along a line II-II of FIG. 1.

FIG. 1 illustrates a plan view schematically showing an optical adhesive film 100, FIG. 2 illustrates a cross-sectional view of the optical adhesive film 100 of FIG. 1, along a line I-I of FIG. 1, and FIG. 3 illustrates a cross-sectional view of the optical adhesive film 100 of FIG. 1, along a line II-II of FIG. 1.

Referring to FIGS. 1 through 3, the optical adhesive film 100 according to an exemplary embodiment may include a transmission unit 110, a first wing unit 111, a second wing unit 112, and a third wing unit 113. The optical adhesive film 100 may include first, second, and third light-blocking members 111b, 112b, and 113b, first, second, and third reflective members 111c, 112c, and 113c, and an adhesive member 114.

Figure 4:
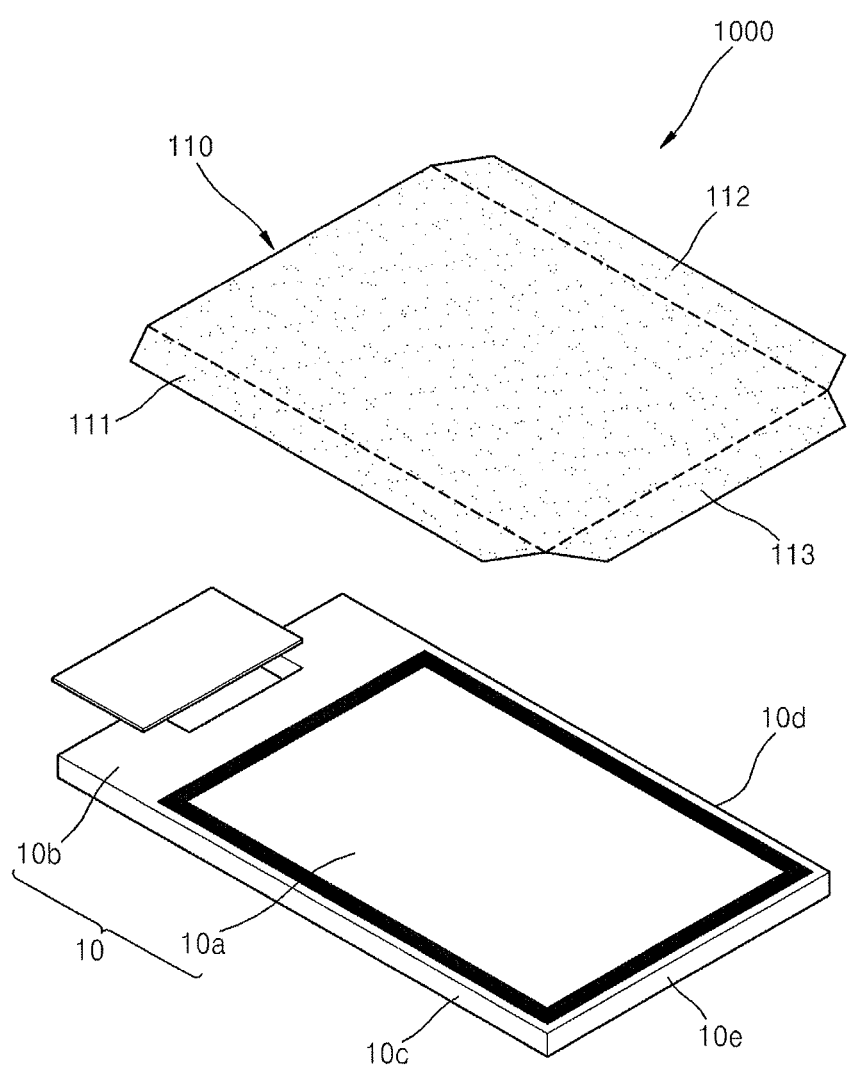
FIG. 4 illustrates an exploded perspective view schematically showing a flat display device including the optical adhesive film, according to an exemplary embodiment.
Figure 5:
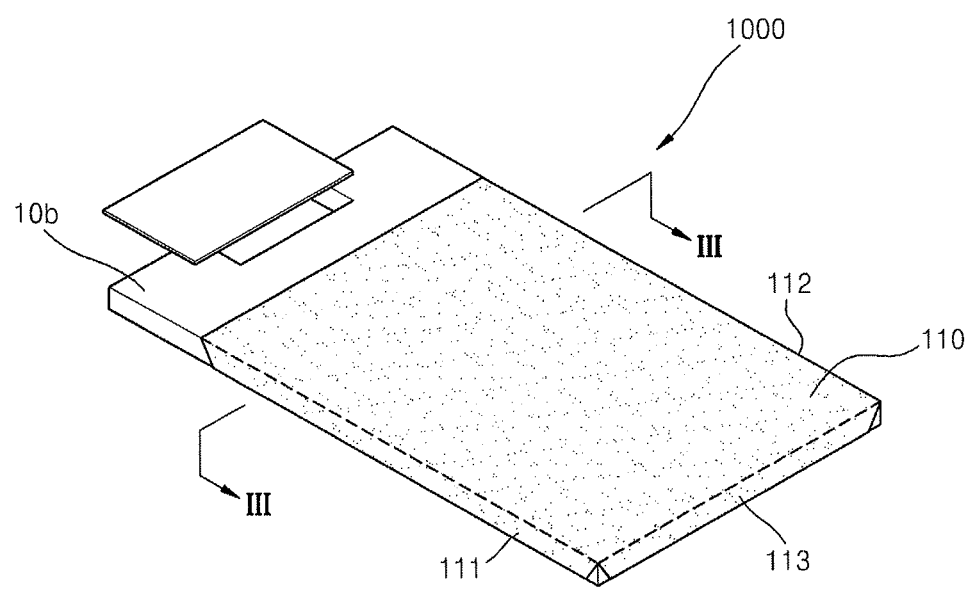
FIG. 5 illustrates a perspective view schematically illustrating the flat display device of FIG. 4.

The transmission unit 110 may be disposed on a display area 10a of a flat display module 10 of FIGS. 4 and 5. The transmission unit 110 may transmit light emitted from the flat display module 10. The transmission unit 110 may be formed of a material having high light permeability. For example, the transmission unit 110 may be formed of a material such as at least one of polyethylene terephthalate (PET), a triacetyl cellulose (TAC) film, polyethylene (PE), acryl, and polyolefin.

As the transmission unit 110 may be disposed on the display area 10a of the flat display module 10 of FIG. 4, the transmission unit 110 may have a shape corresponding to the shape of the display area 10a. Referring to FIGS. 4 and 5, the flat display module 10 may be, e.g., square and thus the transmission unit 110 may also be square so as to correspond to the display area 10a of the flat display module 10.

The first, second, and third wing units 111, 112, and 113 may be formed to extend from sides 110a, 110b, and 110c of the transmission unit 110, respectively. That is, the first wing unit 111 may be formed to extend from one side 110a of the transmission unit 110, the second wing unit 112 may be formed to extend from the other side 110b of the transmission unit 110, and the third wing unit 113 may be formed to extend from the upper side 110c of the transmission unit 110.

The first, second, and third wing units 111, 112, and 113 may be bent from respective sides of the flat display module 10. The first, second, and third wing units 111, 112, and 113 may surround the respective sides of the flat display module 10, and may extend to a portion of the back of the flat display module 10 so as to cover the back of the flat display module 10. That is, the first wing unit 111 may be bent from one side 110a of the transmission unit 110, cover one side 10c of the flat display module 10, bent to the back of the flat display module 10, and cover the portion of the back of the flat display module 10. The second wing unit 112 may be bent from the other side 110b of the transmission unit 110, cover the other side 10d of the flat display module 10, bent to the back of the flat display module 10, and cover the portion of the back of the flat display module 10. The third wing unit 113 may be bent from the upper side 110c of the transmission unit 110, cover an upper side 10e of the flat display module 10, bent to the back of the flat display module 10, and cover the portion of the back of the flat display module 10. Widths t1, t2, and t3 of each of the first, second, and third wing units 111, 112, and 113 may be greater than the thickness, e.g., distance from a front to a back, of the flat display module 10.

The optical adhesive film 100, according to the exemplary embodiment, may cover substantially the entire display area of the flat display device and the sides and the portion of the back of the flat display module 10 so that adhesive strength between elements of the flat display module 10 may be improved, as will be described in detail below.

The first, second, and third wing units 111, 112, and 113 may include first, second, and third base members 111a, 112a, and 113a, first, second, and third light-blocking members 111b, 112b, and 113b, and first, second, and third reflective members 111c, 112c, and 113c, respectively.

That is, the first wing unit 111 may include the first base member 111a, the first light-blocking member 111b disposed on, e.g., directly on, the first base member 111a, and the first reflective member 111c disposed on, e.g., directly on, the first light-blocking member 111b.

The second wing unit 112 may include the second base member 112a, the second light-blocking member 112b disposed on, e.g., directly on, the second base member 112a, and the second reflective member 112c disposed on, e.g., directly on, the second light-blocking member 112b.

The third wing unit 113 may include the third base member 113a, the third light-blocking member 113b disposed on, e.g., directly on, the third base member 113a, the third reflective member 113c disposed on, e.g., directly on, the third light-blocking member 113b.

The first, second, and third base members 111a, 112a, and 113a may extend from the sides 110a, 110b, and 110c of the transmission unit 110, respectively. That is, the first base member 111a may extend from one side 110a of the transmission unit 110. The second base member 112a may extend from the other side 110b of the transmission unit 110. The third base member 113a may be extended from the upper side 110c of the transmission unit 110.

The first, second, and third base members 111a, 112a, and 113a may be formed of a material that is same as that of the transmission unit 110. The first, second, and third base members 111a, 112a, and 113a may be formed of a material such as at least one of a polyethylene terephthalate (PET), a triacetyl cellulose (TAC) film, a polyethylene (PE), an acryl, and a polyolefin.

The first, second, and third light-blocking members 111b, 112b, and 113b may be formed on, e.g., directly on, surfaces of the first, second, and third base members 111a, 112a, and 113a, respectively. That is, the first light-blocking member 111b may be formed on the first base member 111a, the second light-blocking member 112b may be formed on the second base member 112a, and the third light-blocking member 113b may be formed on the third base member 113a. The first, second, and third light-blocking members 111b, 112b, and 113b may include paints or pigments that may absorb light and may be formed by coating the paints or pigments on surfaces of the first, second, and third base members 111a, 112a, and 113a. The first, second, and third light-blocking members 111b, 112b, and 113b may absorb external light incident onto the sides of the flat display module 10 of FIGS. 4 and 5.

The first, second, and third reflective members 111c, 112c, and 113c may be formed on the first, second, and third light-blocking members 111b, 112b, and 113b, respectively. That is, the first reflective member 111c may be formed on the first light-blocking member 111b, the second reflective member 112c may be formed on the second light-blocking member 112b, and the third reflective member 113c may be formed on the third light-blocking member 113b. The first, second, and third reflective members 111c, 112c, and 113c may include paints or pigments that may absorb light and may be formed by coating the paints or pigments on the first, second, and third light-blocking members 111b, 112b, and 113b. The first, second, and third reflective members 111c, 112c, and 113c may face the flat display module 10. The first, second, and third reflective members 111c, 112c, and 113c may reflect light emitted from the flat display module 10, and may protect and/or prevent the light from leaking via the sides of the flat display module 10.

The adhesive member 114 may be disposed to cover one surface of the transmission unit 110 and the first, second, and third reflective members 111c, 112c, and 113c. The optical adhesive film 100 may be adhered to the flat display module 10 by the adhesive member 114. A first surface of the adhesive member 114 may be directly attached to the flat display module 10. A second surface of the adhesive member 114 that opposes the first surface may be directly attached to the transmission unit 110 and the first, second, and third reflective members 111c, 112c, and 113c.

FIG. 4 illustrates an exploded perspective view schematically showing a flat display device 1000 according to an exemplary embodiment, and FIG. 5 illustrates a perspective view schematically showing the flat display device 1000 of FIG. 4.

Referring to FIGS. 4 and 5, the flat display device 1000 includes the flat display module 10 and the optical adhesive film 100.

The flat display module 10 may be, e.g., a liquid crystal display device or an organic light emitting display device.

The optical adhesive film 100 may be adhered to a front surface, e.g., a viewing surface, of the flat display module 10. The flat display module 10 may include the display area 10a for displaying an image and a pad area 10b connected to an external circuit. The transmission unit 110 of the optical adhesive film 100 may be disposed on the display area 10a of the flat display module 10, and the first, second, and third wing units 111, 112, and 113 may surround the sides of the flat display module 10 and may be adhered to a portion of back of the flat display module 10. That is, the first wing unit 111 may cover one side 10c of the flat display module 10, a portion of the back of the flat display module 10, and may be adhered to the flat display module 10. The second wing unit 112 may cover the other side 10d of the flat display module 10, a portion of the back of the flat display module 10, and may be adhered to the flat display module 10. The third wing unit 113 may cover the upper side 10e of the flat display module 10, a portion of the back of the flat display module 10, and may be adhered to the flat display module 10. The first, second, and third wing units 111, 112, and 113 may be adhered to the sides and the back of the flat display module 10 as shown, e.g., in FIGS. 6 through 9.

Since a wing unit may not formed on a lower side 110d of the transmission unit 110 and the transmission unit 110 may be disposed to correspond to the display area 10a of the flat display module 10, the optical adhesive film 100 may not be disposed on the pad area 10b of the flat display module 10. As such the pad area 10b may be substantially exposed by the optical adhesive film 100.

When the flat display module 10 is a liquid crystal display device, a double-sided tape may be disposed on the back of a liquid crystal panel 12 and a front surface of a backlight unit 11 to adhere the liquid crystal panel 12 and the backlight unit 11 to each other. However, according to an exemplary embodiment, the optical adhesive film 100 may adhere the display area 10a, i.e., the front surface of the liquid crystal display module 10, the sides, and the back of the flat display module 10 by the transmission unit 110 and the first, second, and third wing units 111, 112, and 113 so that adhesive strength between the liquid crystal panel 12 and the backlight unit 11 of the liquid crystal display module 10 may be improved.

The first, second, and third light-blocking members 111b, 112b, and 113b and the first, second, and third reflective members 111c, 112c, and 113c may be stacked on one surface of the first, second, and third wing units 111, 112, and 113, respectively. The first, second, and third reflective members 111c, 112c, and 113c may be disposed to face the flat display module 10 so that light emitted from the flat display module 10 to the side of the flat display module 10 may be reflected at the first, second, and third reflective members 111c, 112c, and 113c, respectively. Thus, light may be protected and/or prevented from leaking via the side of the flat display module 10.

In addition, the first, second, and third light-blocking members 111b, 112b, and 113b may be interposed between the first, second, and third reflective members 111c, 112c, and 113c and the first, second, and third base members 111a, 112a, and 113a, respectively, so that the first, second, and third light-blocking members 111b, 112b, and 113b may protect and/or prevent external light from being incident into the liquid crystal display module 10.

Since the first, second, and third wing units 111, 112, and 113 may extend to the sides and the portion of the back of the flat display module 10, the inflowing of foreign substances or moisture may be minimized, reduced, and/or prevented through the sides of the flat display module 10.

Referring to FIG. 5, the first, second, and third wing units 111, 112, and 113 may have tapered sides, e.g., angled sides, so that the corners of the liquid crystal display module 10 may be substantially exposed by the optical adhesive film 100. For example, a length of the sides of the first, second, and third wing units 111, 112, and 113 adjacent to the sides 110a, 110b, and 110c of the transmission unit 110, respectively, may be longer than a length of the opposing sides of the first, second, and third wing units 111, 112, and 113.

Figure 6:
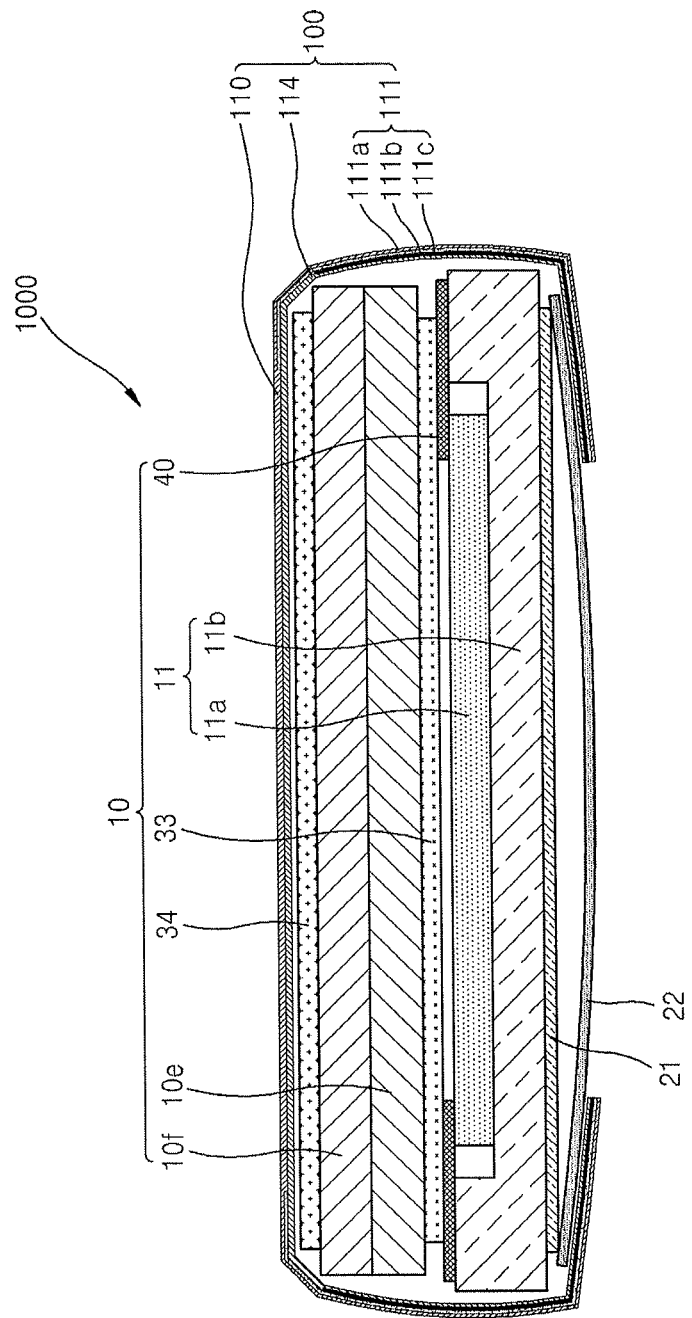
FIG. 6 illustrates a cross-sectional view of the flat display device of FIG. 5, along a line III-III of FIG. 5.

FIG. 6 illustrates a cross-sectional view of the flat display device 1000 of FIG. 5, along a line III-III of FIG. 5.

Referring to FIG. 6, the flat display device 1000 according to the exemplary embodiment may include the flat display module 10, a reflective sheet 21, a support member 22, and the optical adhesive film 100.

The flat display module 10 illustrated in FIG. 6 may be any type of flat display panel, e.g., a liquid crystal display device. Hereinafter, for ease of explanation, the flat panel display module will be referred to as the liquid crystal device 10. The liquid crystal display device 10 may include liquid crystal panels 10e and 10f, the backlight unit 11, a polarizer 33, a polarizing film 34, and an adhesive tape 40.

The liquid crystal panels 10e and 10f include a lower panel 10e and an upper panel 10f. The lower panel 10e may be a thin-film transistor (TFT) panel on which a TFT is disposed. The upper panel 10f may be a color filter panel having a color filter (not illustrated). The polarizing film 34 may be disposed on the upper panel 10f and the polarizer 33 may be disposed below the lower panel 10e.

The backlight unit 11 may include an optical sheet 11a, a light guide plate 11b, and an optical source (not illustrated).

The lower and upper panels 10e and 10f and the backlight unit 11 may be adhered to each other by the adhesive tape 40.

The reflective sheet 21 may be disposed below, e.g., on a surface opposite the lower and upper panels 10e and 10f, the backlight unit 11. The reflective sheet 21 may reflect light exiting a lower side of the light guide plate 11b from among light generated from the optical source (not illustrated). Thus, the reflective sheet 21 may allow the light to be reflected toward the liquid crystal panels 10e and 10f.

The support member 22 may be disposed below the reflective sheet 21. The support member 22 may be adhered, e.g., directly attached, to the optical adhesive film 100. The support member 22 may protect against and/or prevents removal of the reflective sheet 21, which may be generated if the optical adhesive film 100 were to be directly adhered to the reflective sheet 21 instead of the support member 22. That is, the first wing unit 111 of the optical adhesive film 100 may extend to the back of the liquid crystal display device 10. Since the optical adhesive film 100 may be adhered to the liquid crystal display device 10 while the optical adhesive film 100 surrounds the front surface, sides, and a portion of the back of the liquid crystal display device 10, when the reflective sheet 21 is directly adhered to the optical adhesive film 100, the reflective sheet 21 may come off or may be distorted. However, according to an exemplary embodiment, the support member 22 may be disposed at the back of the reflective sheet 21, the optical adhesive film 100 may be directly adhered to the support member 22, and the optical adhesive film 100 may not be directly adhered to the reflective sheet 21 so that lifting of the reflective sheet 21 may be reduced and/or prevented. Therefore, the reflective sheet 21 may be spaced apart from the optical adhesive film 100 such that the optical adhesive film 100 is not directly attached to the reflective sheet 21.

The support member 22 may be formed of a plastic material, e.g., PET.

The transmission unit 110 of the optical adhesive film 100 may be adhered to, e.g., directly adhered to, the polarizing film 34 disposed on the liquid crystal panels 10e and 10f by the adhesive member 114. The first wing unit 111 may extend from the side of the transmission unit 110 so that the first wing unit 111 may extend to the side of the liquid crystal display device 10 and the support member 22 disposed at the back of the liquid crystal display device 10 and thus may be adhered to the support member 22.

As such, the optical adhesive film 100 may be adhered to the liquid crystal display device 10 by covering the front surface, sides, and the back of the liquid crystal display device 10 and thus may improve adhesive strength between elements of the liquid crystal display device 10. Also, as described above, since the support member 22 may be disposed at the back of the reflective sheet 21 and may be directly adhered to the optical adhesive film 100, lifting of the reflective sheet 21 may be reduced and/or prevented. In addition, since the optical adhesive film 100 may cover the front surface, the sides, and the back of the liquid crystal display device 10, a separate molding frame for fixing the elements of the liquid crystal display device 10 may not be needed. Thus, the flat display module 1000 may be thinned and miniaturized and a manufacturing cost thereof may be reduced.

The transmission unit 110 may be adhered throughout the front surface, e.g., may cover substantially the entire front viewing surface, of the upper panel 10f. The transmission unit 110 may be formed of, e.g., a material having high visible light transmittance so that an image emitted through the liquid crystal panels 10e and 10f may be realized through the transmission unit 110.

The first wing unit may include the first base member 111a, the first light-blocking member 111b, and the first reflective member 111c. The first base member 111a may be formed to extend from one side of the transmission unit 110. The first light-blocking member 111b and the first reflective member 111c may be stacked on the first base member 111a.

The first reflective member 111c may face the liquid crystal display device 10, and may reflect light emitted from the liquid crystal display device 10. Thus, the first reflective member 111c may reduce and/or prevent the light from leaking to the outside. The first reflective member 111c may be disposed to correspond to the side and the back of the liquid crystal display device 10.

The first light-blocking member 111b may be disposed outside of the first reflective member 111c, e.g., between the first base member 111a and the first reflective member 111c. The first light-blocking member 111b may absorb light incident from the outside, and reduce and/or prevent external light from being incident into the liquid crystal display device 10. The first light-blocking member 111b may be wider, e.g., have a greater thickness, than the first reflective member 111c. The first reflective member 111c may be disposed on the first base member 111a to cover the sides and the back of the liquid crystal display device 10. However, the first light-blocking member 111b may be disposed not only on the side and back of the liquid crystal display device 10 but also on the front surface of the liquid crystal display device 10.

Figure 7:
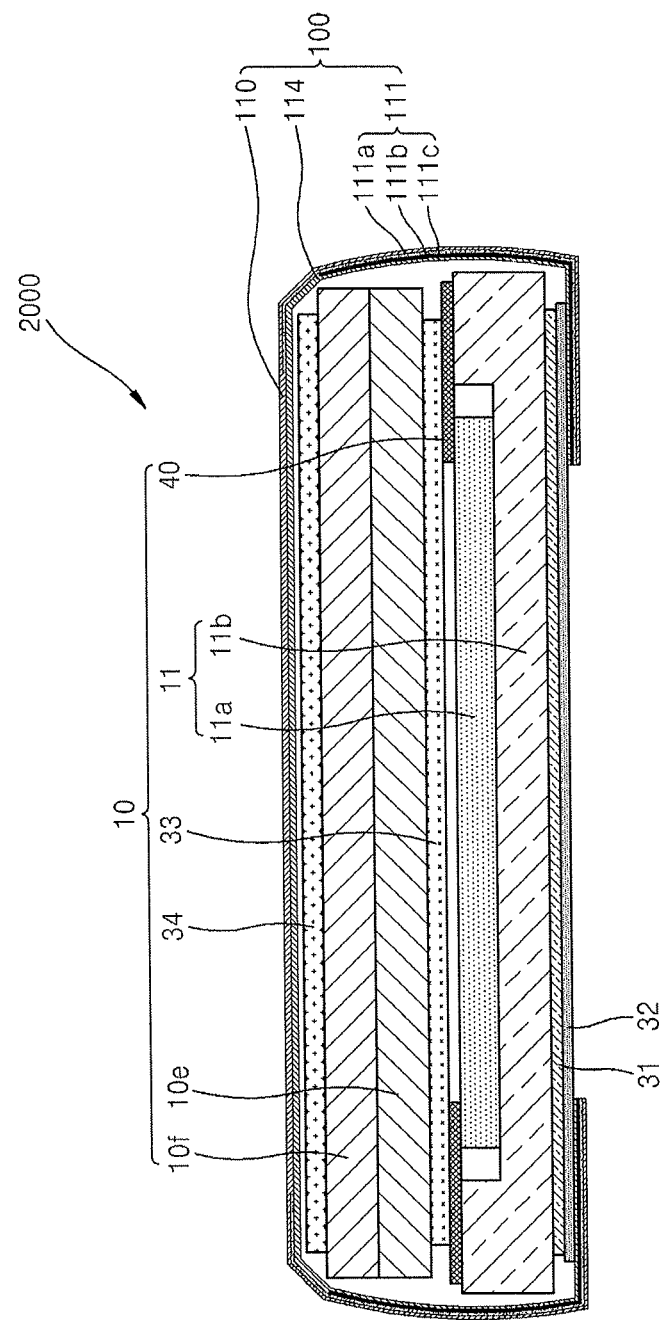
FIG. 7 illustrates a cross-sectional view of a flat display device, according to an exemplary embodiment.

FIG. 7 illustrates a cross-sectional view of a flat display device 2000 according to another exemplary embodiment.

The flat display device 2000 illustrated in FIG. 7 is substantially the same as the flat display device 1000 illustrated in FIG. 6 in terms of elements. However, in the flat display device 1000 illustrated in FIG. 6, the reflective sheet 21 and the support member 22 may be separately manufactured, are not adhered to each other. The support member 22 may be disposed at the back of the reflective sheet 21. However, in the flat display device 2000 illustrated in FIG. 7, a reflective sheet 31 and a support member 32 may be laminated to each other. That is, the reflective sheet 31 and the support member 32 may be separately manufactured and may be laminated. Also, the reflective sheet 31 may be formed by adhering a reflective film in a thin film form on the support member 32 or coating a reflective material on the support member 32. In this case, the support member 32 may be thicker than the reflective sheet 31. A thickness of the support member 32 may be in a range of about 100 to about 200 μm. Without intending to be bound by this theory, when the thickness of the support member 32 is about 100 μm or below, the support member 32, on which the reflective sheet 31 is formed, may be distorted. When the thickness of the support member 32 is about 200 μm or below, a thickness of the flat display device 2000 may be thin.

Figure 8:
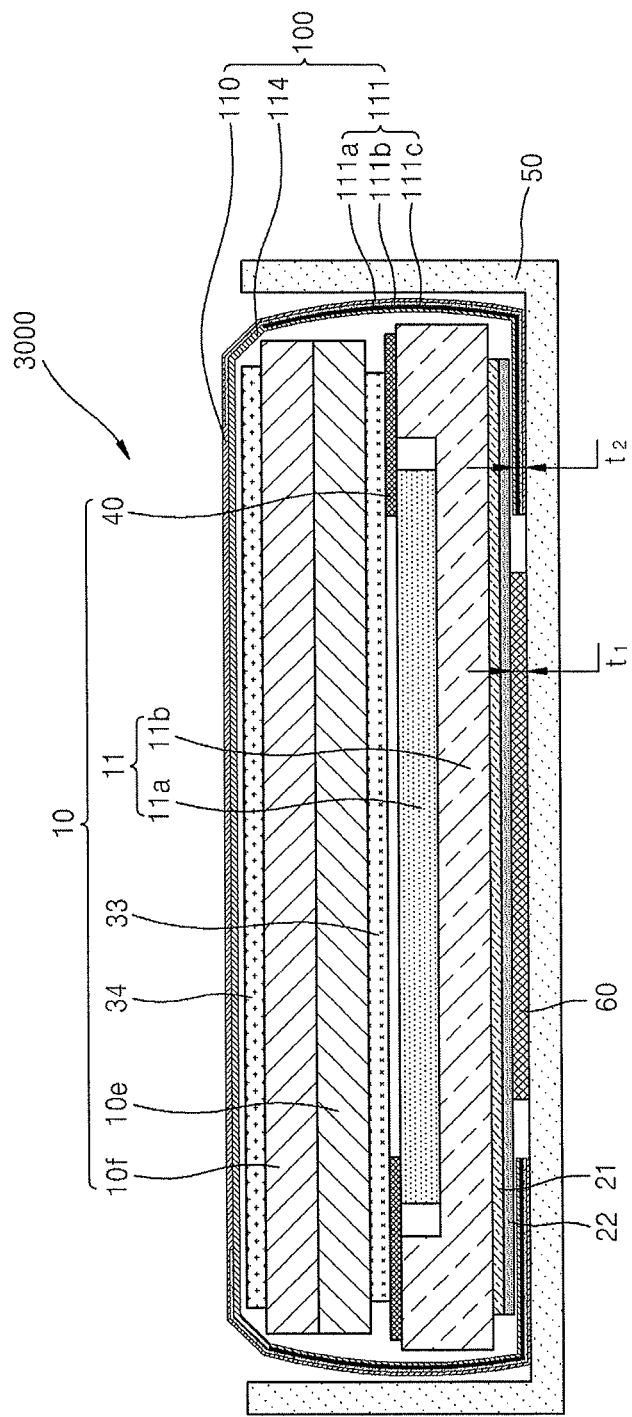
FIG. 8 illustrates a cross-sectional view of a flat display device, according to an exemplary embodiment.

FIG. 8 illustrates a cross-sectional view of a flat display device 3000 according to another exemplary embodiment.

The flat display device 3000 illustrated in FIG. 8 may include the flat display device 1000 of FIG. 6, a double-sided tape 60, and a frame 50. That is, the flat display device 2000 illustrated in FIG. 7 may include the double-sided tape 60 interposed between the flat display device 1000 of FIG. 6 and the frame 50, and the flat display device 1000 of FIG. 6 may be adhered to the frame 50 by the double-sided tape 60.

One surface of the double-sided tape 60 may be adhered to the support member 22 and the other surface thereof may be adhered to the frame 50. As the frame 50 may support the reflective sheet 21, the frame 50 may protect and/or prevent the reflective sheet 21 from hanging down.

A thickness t1 of the double-sided tape 60 may be substantially the same as or greater than a thickness t2 of the optical adhesive film 100. The first wing unit 111 of the optical adhesive film 100 may extend to the back of the reflective sheet 21. Thus, when the thickness t1 of the double-sided tape 60 is the same as the thickness t2 of the optical adhesive film 100, the frame 50 may be adhered to the support member 22 and/or reflective sheet 21 without a separate thickness increase.

Figure 9:
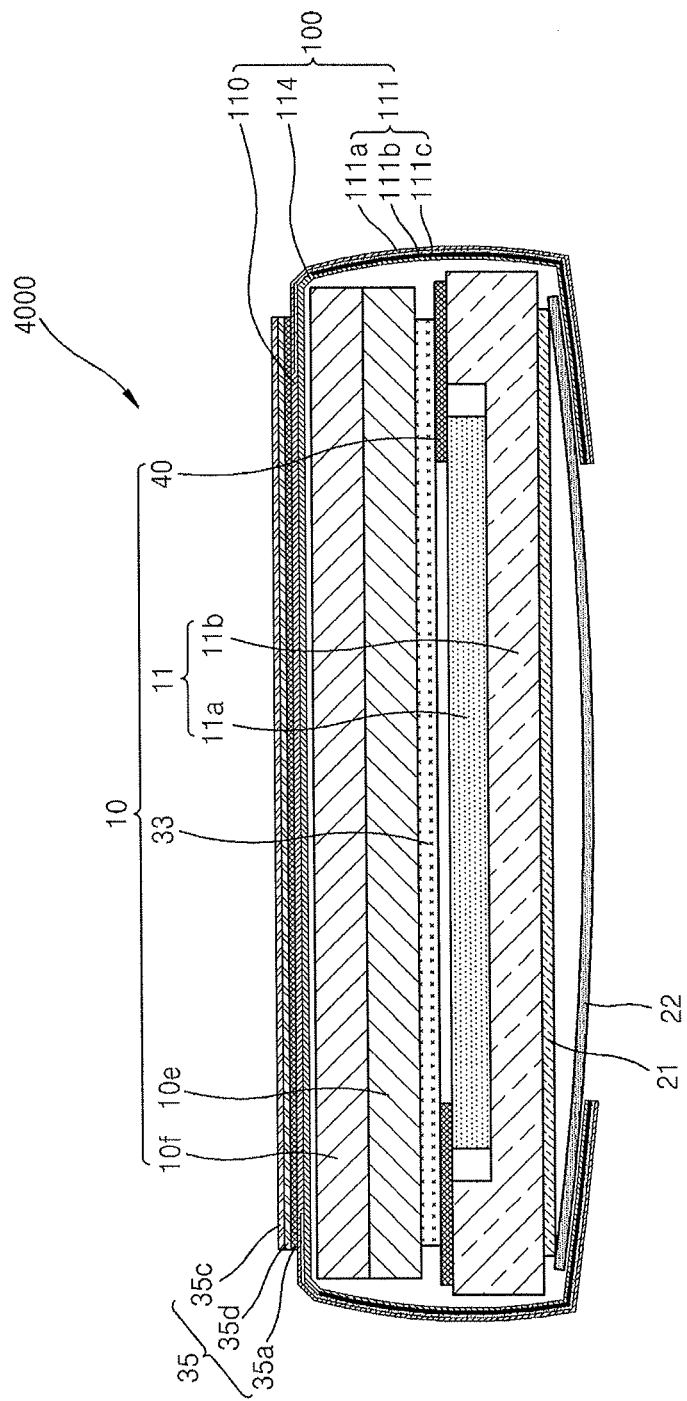
FIG. 9 illustrates a cross-sectional view of a flat display device, according to an exemplary embodiment.

FIG. 9 illustrates a cross-sectional view of a flat display device 4000 according to another exemplary embodiment.

The flat display device 4000 illustrated in FIG. 9 is distinguished from the flat display device 1000 of FIG. 6 in that the polarizing film 34 of FIG. 6 is not formed on the liquid crystal panels 10e and 10f in the flat display device 4000, and instead, a polarized unit 35 is formed on a transparent unit 110, and the transparent unit 110 and the first, second, and third wing units 111, 112, and 113 are each formed of a retardation film.

The polarized unit 35 may be formed on the transparent unit 110. The polarized unit 35 may be formed by sequentially stacking a first triacetyl cellulose (TAC) film 35a, polyvinyl alcohol (PVA) 35b, a second TAC film 35c on the transparent unit 110. The transparent unit 110 and the first, second, and third wing units 111, 112, and 113 may each be formed of a retardation film and surround the front surface, the sides, and a portion of the flat display module 10. The retardation film may be an optical film that is transparent and easily mass-produced, and may include at least one of, e.g., cyclo olefin polymer (COP), cyclo olefin co-polymer (COC), Polycarbonate (PC), poly ethylene terephthalate (PET), polypropylene (PP), polysulfone (PSF), poly(methyl methacrylate) (PMMA), and the like. In particular, the retardation film may include COP or COC.

According to one or more exemplary embodiments, the optical adhesive film 110 may be adhered to the front surface of the flat display module and the sides and the back of the flat display module so that adhesive strength between elements of the flat display module may be improved. Also, the optical adhesive film may be adhered to the support member, instead of a reflective plate, and thus the reflective plate may be protected and/or prevented from being distorted.

Regarding the different types of flat panel display devices, the structures and manufacturing process of PDPs may be simple. As such, the PDPs have been highlighted as display devices that easily have large area displays. However, the PDPs have also been described as having low luminous efficiency and brightness and as having high power consumption.

EL display devices may be classified into inorganic EL display devices and organic EL display devices. The EL display devices have been characterized as including self-luminous elements that have rapid response speeds, high luminous efficiency, brightness, and large viewing angles. From among the EL display devices, organic light-emitting diode display devices, which use organic light-emitting diodes as EL elements using organic materials, have been characterized as having low direct current driving voltage, as being easily thinned, as emitting light uniformly, as being easily patterned, as having high luminous efficiency, and as emitting all colors in the visible range. Thus, the organic light-emitting diode display devices have been widely studied for application to display devices.

Such organic light-emitting diode display devices may be classified into a bottom-emission type display device and a top-emission type display device according to a direction of emitting light. Also, the organic light-emitting diode display devices may be classified into passive matrix organic emitting light diode (PMOLED) display devices and active matrix organic emitting diode (AMOLED) display devices according to a driving method.

By way of summation and review, embodiments relate to flat display devices, which include the self light emitting and the non-self light emitting display devices, that include an optical adhesive film. The flat display device including the optical adhesive film may have improved adhesive strength between panels in the flat display device and the optical adhesive film may protect and/or prevent a reflector from being distorted.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A flat display device, comprising:
a flat display module that produces an image and includes a backlight and a liquid crystal panel;
a reflective sheet at a rear side of the flat display module, the backlight interposed between the reflective sheet and the liquid crystal panel, the reflective sheet not being transmissive;
a support overlapping the reflective sheet, the reflective sheet interposed between the flat display module and the support;
an optical adhesive film adhered to a front surface of the flat display module, to sides of the flat display module, and to at least a portion of a back of the support that is opposite the reflective sheet, the optical adhesive film covering substantially the entire front surface, wherein the image is to be produced on the front surface of the flat display module and is to be emitted through the optical adhesive film, the optical adhesive film being transmissive to the image, and wherein the optical adhesive film is in direct contact with the support, the support is between the optical adhesive film and the reflective sheet, and the support is at least partially separated from the reflective sheet by a gap.

2. The flat display device of claim 1, wherein the reflective sheet includes a material that reflects light to be generated from the flat display module in a direction towards the optical adhesive film.

3. The flat display device of claim 1, wherein the support includes plastic.

4. The flat display device of claim 1, wherein the gap protects against removal of the reflective sheet when the optical adhesive film is removed.

5. The flat display device of claim 1, wherein the optical adhesive film includes:
a transmission area overlapping the front surface of the flat display module for transmitting the image;
a wing area extended from the transmission area to cover the sides and the portion of the back of the support; and
an adhesive covering the transmission area and a front surface of the wing area, the adhesive adhering the flat display module, the transmission area, and the wing area.

6. The flat display device of claim 5, wherein the transmission area transmits light emitted from the flat display module.

7. The flat display device of claim 6, wherein the transmission area includes one of polyethylene terephthalate (PET), a triacetyl cellulose (TAC) film, a polyethylene (PE), an acryl, or a polyolefin.

8. The flat display device of claim 5, wherein the transmission area has a size substantially equal to or greater than a display area for displaying the image on the flat display module.

9. The flat display device of claim 5, wherein the wing area has a thickness greater than a thickness of the flat display module.

10. The flat display device of claim 5, wherein the wing area covers one side of the flat display module and the portion of the back of the support that is opposite the reflective sheet.

11. The flat display device of claim 5, wherein the wing area includes:
a base extending from one side of the transmission area;
a light-blocking region on the base; and
a reflective region on the light-blocking region.

12. The flat display device of claim 11, wherein the base is integrally formed with the transmission area as a single continuous body.

13. The flat display device of claim 12, wherein the base includes at least one of polyethylene terephthalate (PET), a triacetyl cellulose (TAC) film, a polyethylene (PE), an acryl, or a polyolefin.

14. The flat display device of claim 11, wherein the light-blocking region absorbs external light incident through the base.

15. The flat display device of claim 14, wherein the light-blocking region includes a paint or a pigment that may absorb visible light.

16. The flat display device of claim 11, wherein the light-blocking region has a size larger than or substantially equal to a size of the reflective region.

17. The flat display device of claim 11, wherein the light-blocking region entirely overlaps the wing area and a portion of the transmission area.

18. The flat display device of claim 11, wherein the reflective region reflects light emitted from the flat display device and protects the light from leaking.

19. The flat display device of claim 18, wherein the reflective region includes a paint or a pigment that reflects the light.

20. The flat display device of claim 1, wherein the flat display module includes a polarizer in a stack that includes the backlight and the liquid crystal panel.

21. The flat display device of claim 1, wherein the reflective sheet and the support are separately formed and are laminated.

22. The flat display device of claim 1, wherein the support has a thickness greater than a thickness of the reflective sheet.

23. The flat display device of claim 1, wherein the reflective sheet includes a reflective material coated on the support.

24. The flat display device of claim 1, wherein the reflective sheet includes a reflective film adhered to the support.

25. The flat display device of claim 5, wherein the transmission area and the wing area includes a retardation film.

26. The flat display device of claim 25, wherein a polarizing material is on the transmission area.

27. The flat display device of claim 26, wherein the polarizing material includes a TAC film, a polyvinyl alcohol (PVA), and a TAC film sequentially stacked on the transmission area.

28. The flat display device of claim 1, wherein support does not have bending portions.

29. The flat display device of claim 1, wherein the optical adhesive film directly contacts the support.

* * * * *